(12) United States Patent
Wall et al.

(10) Patent No.: US 6,223,289 B1
(45) Date of Patent: Apr. 24, 2001

(54) METHOD AND APPARATUS FOR SESSION MANAGEMENT AND USER AUTHENTICATION

(75) Inventors: Gerard A. Wall, San Jose; Alan T. Ruberg, Foster City; James G. Hanko, Redwood City; J. Duane Northcutt, Menlo Park; Lawrence L. Butcher, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/063,339

(22) Filed: Apr. 20, 1998

(51) Int. Cl.[7] ................................................. G06F 11/30
(52) U.S. Cl. ........................................ 713/201; 709/227
(58) Field of Search .................................. 713/201, 200; 709/200, 201, 203, 217, 218, 219, 220, 221, 222, 223, 227, 228, 229

(56) References Cited

U.S. PATENT DOCUMENTS

| | | |
|---|---|---|
| 5,027,269 * | 6/1991 | Grant et al. ........................... 364/200 |
| 5,291,585 | 3/1994 | Sato et al. . |
| 5,335,320 | 8/1994 | Iwata et al. . |
| 5,345,550 | 9/1994 | Bloomfield . |
| 5,347,627 | 9/1994 | Hoffmann et al. . |
| 5,384,911 | 1/1995 | Bloomfield . |
| 5,412,772 | 5/1995 | Monson . |
| 5,414,806 | 5/1995 | Richards . |
| 5,423,034 | 6/1995 | Cohen-Levy et al. . |
| 5,430,836 | 7/1995 | Wolf et al. . |
| 5,436,637 | 7/1995 | Gayraud et al. . |
| 5,448,695 | 9/1995 | Douglas et al. . |
| 5,461,399 | 10/1995 | Cragun . |
| 5,461,710 | 10/1995 | Bloomfiled et al. . |
| 5,473,745 | 12/1995 | Berry et al. . |
| 5,491,784 | 2/1996 | Douglas et al. . |
| 5,493,638 | 2/1996 | Hooper et al. . |
| 5,509,116 | 4/1996 | Hiraga et al. . |
| 5,526,517 | 6/1996 | Jones et al. . |
| 5,544,288 | 8/1996 | Morgan et al. . |
| 5,546,519 | 8/1996 | Berry . |
| 5,548,702 | 8/1996 | Li et al. . |
| 5,550,968 | 8/1996 | Miller et al. . |
| 5,559,942 | 9/1996 | Gough et al. . |
| 5,564,003 | 10/1996 | Bell et al. . |
| 5,566,330 | 10/1996 | Sheffield . |
| 5,570,462 | 10/1996 | McFarland . |
| 5,572,643 | 11/1996 | Judson . |

(List continued on next page.)

OTHER PUBLICATIONS

Ronald L. Johnston, "The Dynamic Incremental Compiler of APL/3000" Proceedings of the API '79 Conference, published as APL Quote Quad, 9(4), p 82–87.

(List continued on next page.)

Primary Examiner—Thomas G. Black
Assistant Examiner—Mary Wang
(74) Attorney, Agent, or Firm—The Hecker Law Group

(57) ABSTRACT

Authentication and session management can be used with a system architecture that partitions functionality between a human interface device (HID) and a computational service provider such as a server. An authentication manager executing on a server interacts with the HID to validate the user when the user connects to the system via the HID. A session manager executing on a server manages services running on computers providing computational services on behalf of the user. The session manager notifies each service in a session that the user is attached to the system using a given HID. A service can direct display output to the HID while the user is attached to the system. When a user detaches from the system, each of the service's executing for the user is notified via the authentication manager and the session manager. Upon notification that the user is detached from the system, a service can continue to execute while stopping its display to the HID.

20 Claims, 11 Drawing Sheets

U.S. PATENT DOCUMENTS

| | | |
|---|---|---|
| 5,590,199 | 12/1996 | Krajewski, Jr. et al. . |
| 5,694,603 | 12/1997 | Reiffin . |
| 5,694,604 | 12/1997 | Reiffin . |
| 5,754,830 * | 5/1998 | Butts et al. .......................... 395/500 |
| 5,832,228 * | 11/1998 | Holden et al. ....................... 713/201 |
| 5,935,212 * | 8/1999 | Kalajan et al. ...................... 709/228 |
| 5,940,591 * | 8/1999 | Boyle et al. ......................... 713/201 |
| 5,944,794 * | 8/1999 | Okamoto et al. .................... 713/201 |
| 5,964,836 * | 10/1999 | Rowe et al. ......................... 709/221 |

OTHER PUBLICATIONS

Leo J. Guibas et al., "Compilation and Delayed Evaluation in APL," Fifth Annual Synposium on Principles in Programming Languages, p. 1–8, 1978.

Gleen Krasner "The Smalltalk–80 Virtual Machine" BYTE Publications Inc., Aug. 1991, pp. 300–320.

Schneier, Bruce, "Why Cryptography is Harder Than It Looks," Copyright 1996, Counterpane Systems.

"(PAM) Pluggable Authentication Module," Dated: Mar. 26, 1997.

Miller, Steve, "Kerberos—Introduction to the Kerberos System," Copyright 1985, 1986, Massachusetts Institute of Technology.

Dasgupta, Sanjay et al., "*A Movable User Interface Based on a Simple X–Window Like Protocol,*" Proceedings of the International Conference on EC3—Energy, Computer, Communication and Control Systems, Aug. 28–30, 1991, pp. 199–203, vol. 3.

* cited by examiner

METHOD AND APPARATUS FOR SESSION MANAGEMENT AND USER AUTHENTICATION

BACKGROUND OF THE INVENTION

1. Field of the Invention

This invention relates computer systems and, more specifically, to user authentication and the location management of user sessions.

2. Background Art

The paradigms by which computer systems have been configured have changed over time. In earlier times, a computer consisted of a so called "mainframe" computer that was accessed by a plurality of "dumb terminals". The mainframe was a central station that provided computational power and data storage. A dumb terminal was a display device for data provided by the mainframe, and also provided a means to communicate some data to the mainframe. Other system paradigms followed, including the desktop computer, client/server architectures, and recently, the so-called network computer.

A desktop computer is a self contained computing system where all applications and data are resident on the desktop computer system itself. Such systems were implemented in personal computers and have spurred the use of computers in homes and offices. A disadvantage of desktop computers is the short lifetime of the hardware used in the system. Desktop computers are microprocessor driven, and as faster and more powerful microprocessors become available, upgrades of existing desktop systems, or purchase of new desktop systems, is required. In many offices, there are personal desktop computers distributed throughout, sometimes numbering in the thousands and tens of thousands. A disadvantage of such large systems is the lack of compatibility of applications and data on individual systems. Some users may have more recent versions of software applications that are not backwards compatible with older versions of the software. The solution to this problem is to maintain consistent software on all systems. However, the cost to upgrade each system and to provide licensed copies of software and software upgrades can be substantial.

Client server systems are systems where central stores of data and/or applications are accessed through a network by personal computer clients. This provides some administrative efficiency in maintaining the shared data. However, the clients still have local applications and data that can present the same kinds of problems faced in the desktop systems already described.

Recently, the rise of the internet has resulted in the proposed use of so-called "network computers". A network computer is a stripped down version of a personal computer with less storage space, less memory, and often less computational power. The idea is that network computers will access data through the internet, and only those applications that are needed for a particular task will be provided to the network computer. When the applications are no longer being used, they are not stored on the network computer. There has been some criticism of such systems as lacking the power of a full desktop system, yet not being inexpensive enough to justify the reduced capability. And even though the network computer is a subset of a desktop computer, the network computer may still require upgrades of hardware and software to maintain adequate performance levels.

An example of a dynamic host configuration protocol is provided in RFC 2131. RFCs 1321 and 2104 contain examples of MD5, or message digesting. A point to point challenge host authentication protocol is contained in RFC 1994.

SUMMARY OF THE INVENTION

Authentication and session management can be used with a system architecture that partitions functionality between a human interface device (HID) and a computational service provider such as a server. An authentication manager executing on a server interacts with the HID to validate the user when the user connects to the system via the HID. A session manager executing on a server manages services running on computers providing computational services (e.g., programs) on behalf of the user. The session manager notifies each service in a session that the user is attached to the system using a given desktop machine. A service can direct display output to the HID while the user is attached to the system. When a user detaches from the system, each of the service's executing for the user is notified via the authentication manager and the session manager. Upon notification that the user is detached from the system, a service continues to execute while stopping its display to the desktop machine.

DETAILED DESCRIPTION OF THE INVENTION

A method and apparatus for session management and user authentication is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Overview

Methods and apparatus are described according to one or more embodiments of the invention for authenticating a system user and management services executing in the system on behalf of the user. In one embodiment of the invention, authenticating and session management are performed within a system architecture that partitions the computing functionality between a user's HID and a computational service provider such as a server.

Figure 1:
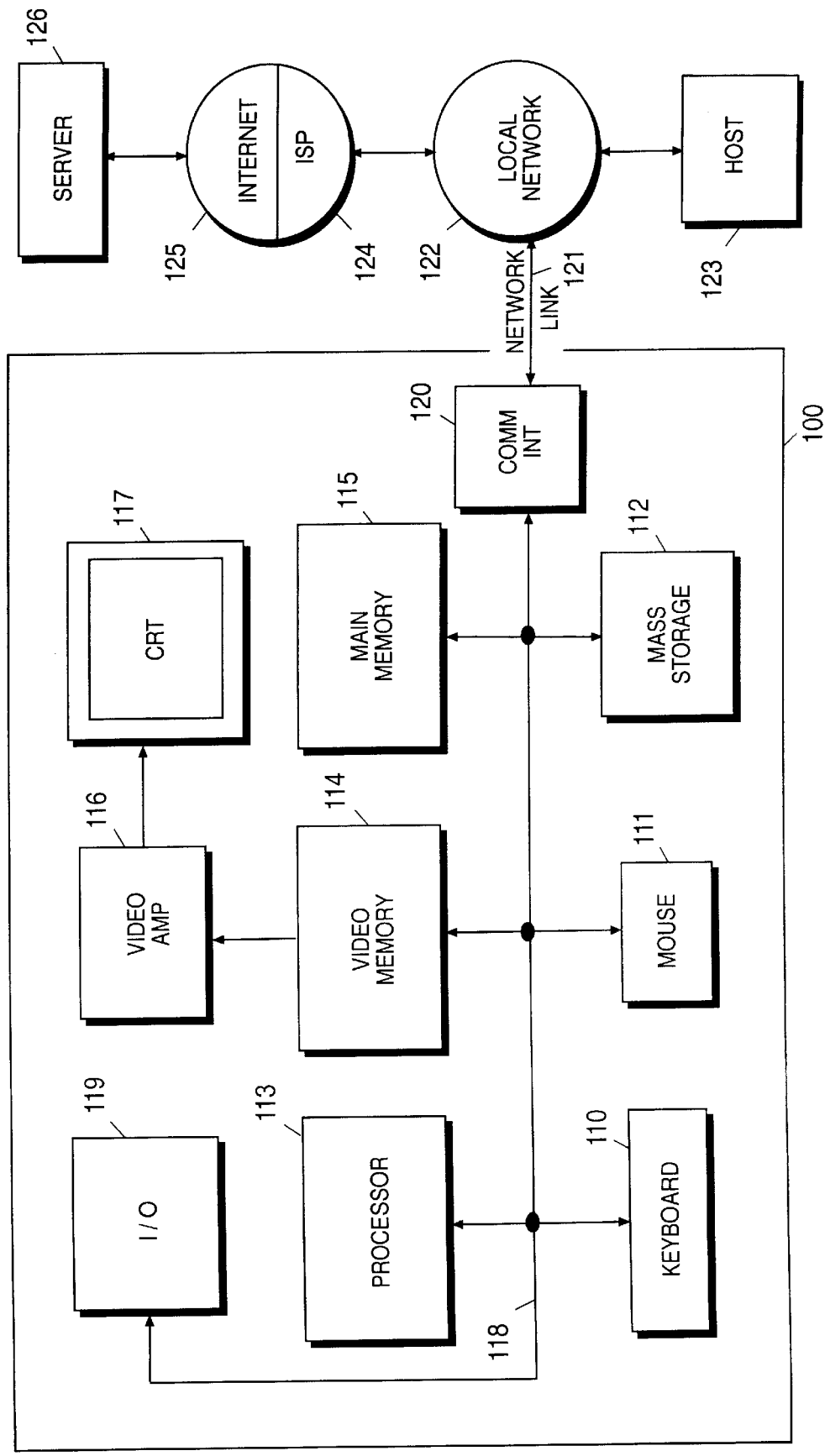
FIG. 1 is an example of system architectures used in one or more embodiments of the invention.
Figure 7:
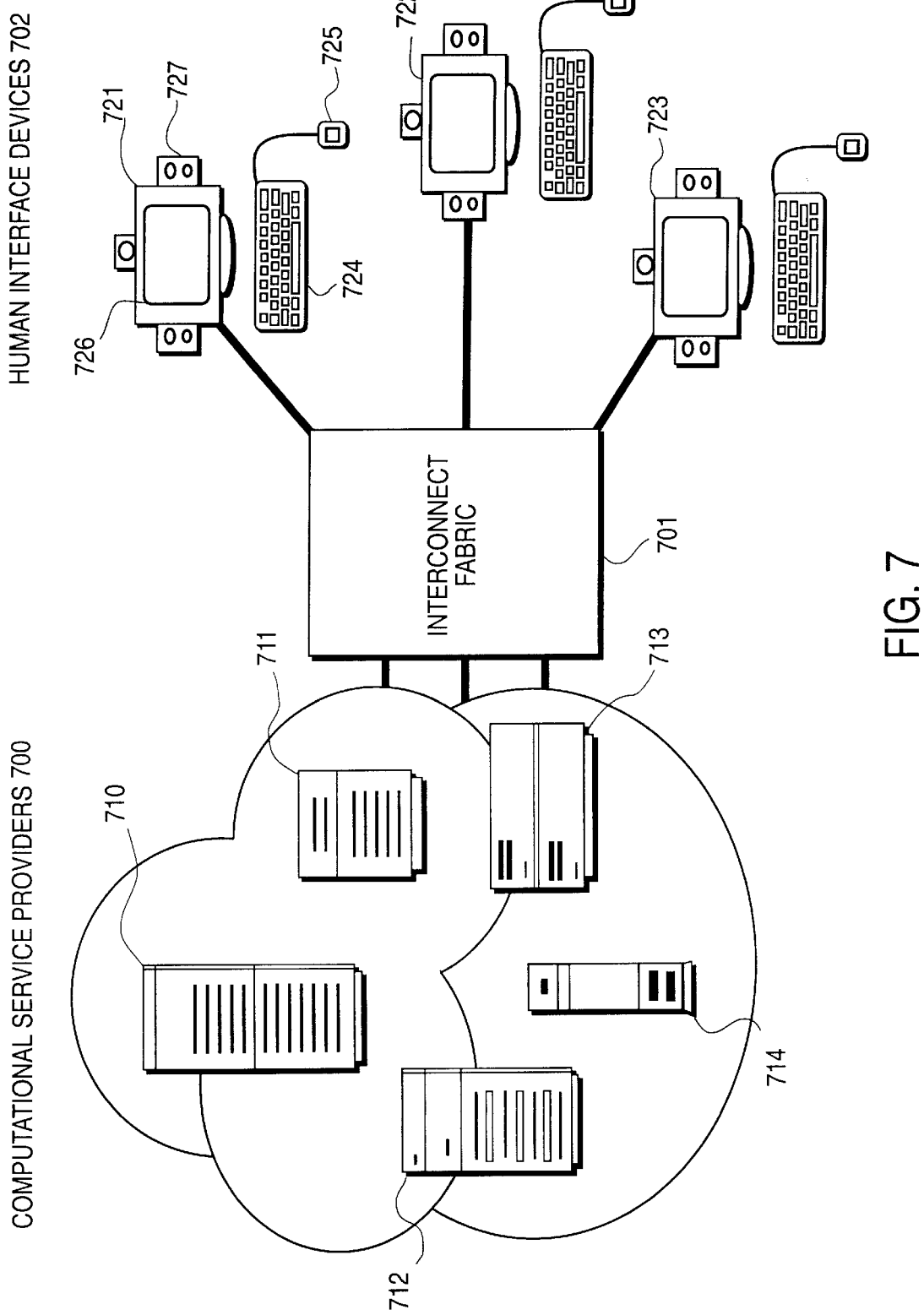
FIGS. 7 and 8 provide examples of system architectures used in one or more embodiments of the invention.
Figure 8:
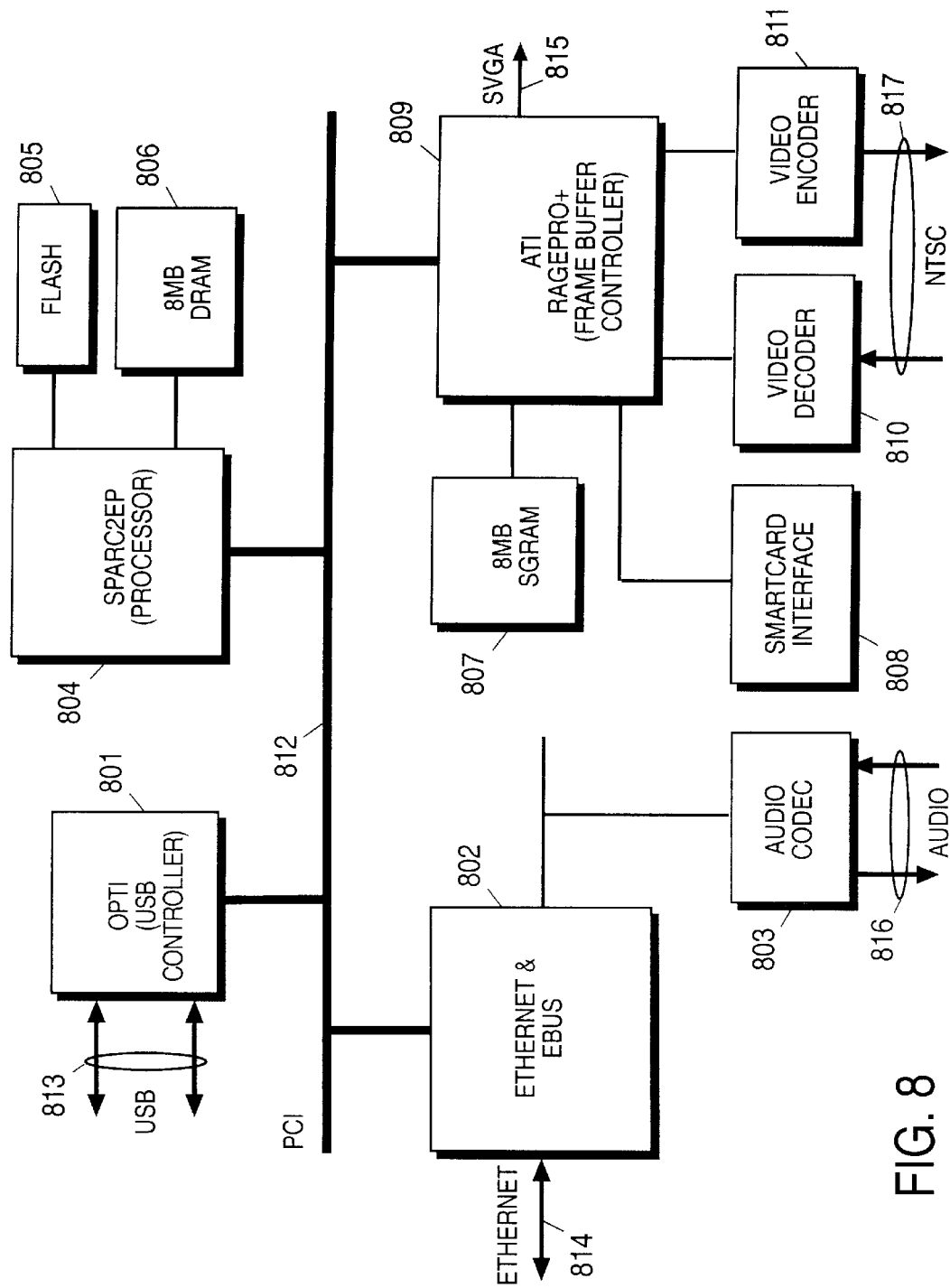

FIGS. 1, 7, and 8 provide examples of system architectures used in one or more embodiments of the invention. The present invention can be implemented in standard desktop computer systems such as described in FIG. 1, or in any other computer systems, including client—server systems, network computers, or the human interface device system of FIGS. 7 and 8.

Embodiment of Computer Execution Environment (Hardware)

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Alternatively, video memory 114 could be used to drive a flat panel or liquid crystal display (LCD), or any other suitable data presentation device. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem or cable modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

Human Interface Device Computer System

The invention also has application to a computer systems where the data to be displayed is provided through a network. The network can be a local area network, a wide area network, the internet, world wide web, or any other suitable network configuration. One embodiment of the invention is used in computer system configuration referred to herein as a human interface device computer system.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 7. Referring to FIG. 7, the system consists of computational service providers 700 communicating data through interconnect fabric 701 to HIDs 702.

Computational Service Providers—In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 7, the services are found on computers 710, 711, 712, 713, and 714.

Examples of services include X11/Unix services, archived video services, Windows NT service, Java™ program execution service, and others. A service herein is a process that provides output data and responds to user requests and input.

Interconnection Fabric—In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

HIDs—The HID is the means by which users access the computational services provided by the services. FIG. 7 illustrates HIDs 721, 722, and 723. A HID consists of a display 726, a keyboard 724, mouse 725, and audio speakers 727. The HID includes the electronics need to interface these devices to the interconnection fabric and to transmit to and receive data from the services.

A block diagram of the HID is illustrated in FIG. 8. The components of the HID are coupled internally to a PCI bus 812. A network control block 802 communicates to the interconnect fabric, such as an ethernet, through line 814. An audio codec 803 receives audio data on interface 816 and is coupled to block 802. USB data communication is provided on lines 813 to USB controller 801.

An embedded processor 804 may be, for example, a Sparc2ep with coupled flash memory 805 and DRAM 806. The USB controller 801, network controller 802 and embedded processor 804 are all coupled to the PCI bus 812. Also coupled to the PCI 812 is the video controller 809. The video controller 809 may be for example, and ATI RagePro+ frame buffer controller that provides SVGA output on line 815. NTSC data is provided in and out of the video controller through video decoder 810 and video encoder 811 respectively. A smartcard interface 808 may also be coupled to the video controller 809.

The computer systems described above are for purposes of example only. An embodiment of the invention may be implemented in any type of computer system or programming or processing environment.

In one or more embodiments of the invention, authentication and session management components are configured to authenticate users and locate and manage sessions. A session is a persistent representation of a related set of one or more services executing on behalf of a user. Embodiments of the invention authenticate a user and relocate a user's session based on the current location of the user without requiring a service within a session to be configured to perform user validation and relocation. Embodiments of the invention authenticate the user once for all of the user's services. Using embodiments of the invention, services are directed to the HID (or other terminal device) that a user is currently using. It is not necessary for the user to login to each service and establish a new connection for a specific HID.

According to embodiments of the invention, authentication is a one-way authentication which improves the manageability and scalability of authentication. There is no need to exchange keys and avoids the need to perform key lookups in a central database.

Figure 2:
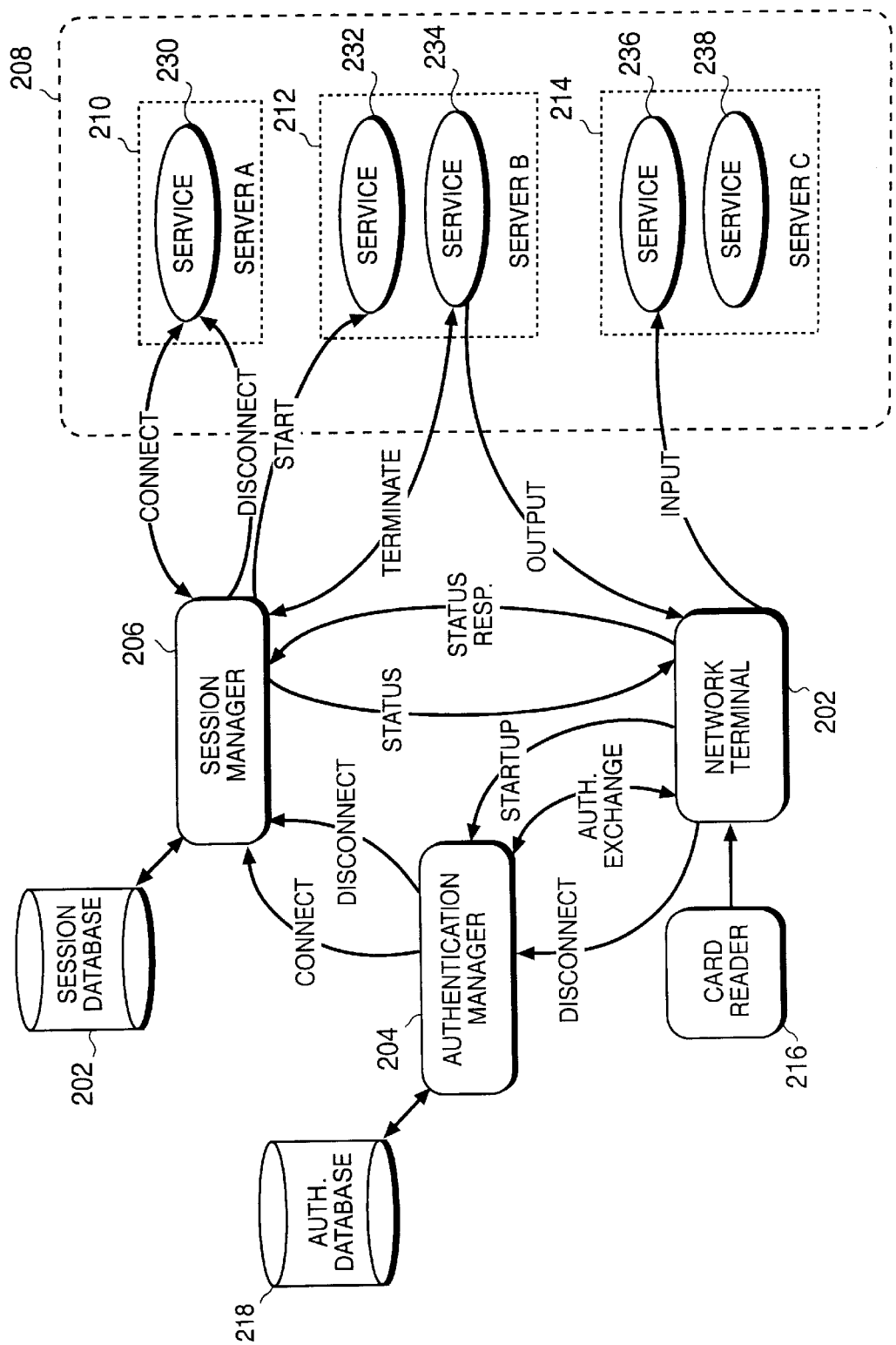
FIG. 2 illustrates authentication and session management components and their interactions according to an embodiment of the invention.

FIG. 2 illustrates authentication and session management components and their interactions according to an embodiment of the invention. Network terminal 202 is a human interface device (HID) (e.g., HIDs 821, 822 and 823). An HID has, as examples of its functions, the task of displaying output of services to a user and obtaining input to services from the user. Network terminal 202 has the ability to respond to a command (e.g., display command) received from, for example, a software program (e.g., services 230–238, authentication manager 204 and session manager 206) executing on a computational service provider (e.g., computers 710, 711, 712, 713, and 714). The input received from a user is forwarded to, for example, a service that is fulfilling a user request.

More than one server can execute the services that comprise a session. For example, in session 208, service 230 is executing on server 210, services 232 and 234 are executing on server 212 and services 236 and 238 are executing on server 214.

A user accesses a system (e.g., a server, a session, a service and a network terminal) by initiating a login. During login, the user is validated by authentication manager 204. Various techniques can be used to allow the user to initiate a login. For example, the user can initiate a login by pressing a key on network terminal 202.

In one embodiment of the invention, a user accesses the system by inserting a smart card in a card reader (e.g., card reader 216) attached to network terminal 202. A smart card is a card that is capable of storing information such as in a magnetic strip or memory of the smart card. The smart card can store user information such as a user's identification (i.e., user ID such as a 64-bit number) and a secret code (e.g., a 128-bit random number) that is transmitted to network terminal 202. The secret code is used during authentication.

Network terminal 202 is aware of (or can obtain) its interconnection network address and the address of authentication manager 204. When a user initiates the login, network terminal 202 initiates communication with authentication manager 204 to begin authentication. Authentication manager 204 is a program active (e.g., executing) on a computational service provider connected to network terminal 202 via an interconnection network such as a local area network (LAN), for example. It should be apparent, however, that network terminal 202 can be connected to authentication manager 204 using other interconnection network technologies such as a fiber channel loop or point-to-point cables. Network terminal 202 sends a startup request to authentication manager 204 that includes a user identification (userID).

In one embodiment of the invention, authentication manager 204 responds to the startup request by initiating an authentication to validate the user. Authentication can include any mechanism that verifies the identify of the user to the system. A key or password known only to the user, or biometrics information can be used to authenticate the user.

In an embodiment of the invention, authentication is performed by verifying a personal identification number (PIN) entered by the user at network terminal 202. Authentication manager 204 sends a command (i.e., a challenge command) to initiate entry of the user's PIN at network terminal 202. The user entry is packaged by network terminal 202 and transmitted to authentication manager 204 (i.e., a challenge response).

Authentication manager 204 verifies the challenge response with user information retained in authentication database 218, information supplied by the user and information that is generated during authentication. When the user is authenticated, the user is given access to a session (e.g., session 208).

If the expected result is received from the user, authentication manager 204 notifies session manager 206 (via a connect message) that the user has logged into the system on network terminal 202. Session information contained in authentication database 218 is used to identify the server, port and session identifier (ID) for session manager 206. Session manager 206 is a program that is active on a computational service provider and is connected to authentication manager 204 and network terminal 202 via an interconnection network, for example. Authentication manager 204 sends a message to session manager 206 using session manager 206's server and port information contained in authentication database 218.

In response to the connect message from authentication manager 204, session manager 206 notifies the services in the user's current session (i.e., the services in session 208) that the user is attached to network terminal 202. That is, session manager 206 sends a connect message to services 230–238 to direct output to network terminal 202. Session manager 206 ensures that services that are considered to be required services of the session are executing. If not, session manager 206 causes them to be initiated. The user can interact with services 230–238 within a session (e.g., session 208). Network terminal 202 is connected to servers 210, 212 and 214 (and services 230–238) via an interconnection network such as a local area network or other interconnection technology. The user can also start new services or terminate existing services.

The user can detach from the system by removing the card from card reader 216. Other mechanisms to express a disconnect can also be used with the invention (e.g., a "sign-off button on network terminal 202). Services 230–238 can continue to run even after the user removes the card from card reader 216. That is, a user's associated session(s) and the services that comprise a session can continue in existence during the period that a user is unattached (e.g., logged off) from the system. When the user removes the card from card reader 216, network terminal 202 notifies authentication manager 204 (e.g., via a disconnect message) which notifies session manager 206 (e.g., via a disconnect message). Session manager 206 notifies services 230–238 (e.g., via a disconnect message) which terminate their transmission of display commands to network terminal 202. Services 230–238 continue execution, however, during the time that the user is not logged onto a network terminal. The user can log back in using a network terminal such as network terminal 202, connect to session 208 and interact with services 230–238.

While FIG. 2 depicts a single instance of each, it should be apparent that there can be multiple instances of network terminal 202, authentication manager 204, session 208. For example, there can be more than one instance of authentication manager 204 servicing network terminal 202 or multiple instances of network terminal 202. Authentication manager 204 instances can be organized in a hierarchy according to the topology of the network or they can be globally available, for example.

Having more than one instance of the authentication manager improves the scalability of the system since it is possible to add (or remove) instances of authentication manager 204 based on the current load (e.g., the number of users). Further, reliability is improved since redundant instances of authentication manager 204 can be deployed.

Similarly, there can be a multiplicity of session manager 206 instances. Like authentication manager 204, multiple instances of session manager 206 can increase the scalability and reliability of the system.

Session Manager

Session manager 206 maintains session database 220 that contains mappings between users, sessions, and services. Session manager 206 manages the services that comprise each session managed by session manager 206. For example, session manager 206 maintains session 208 and services 230–238 within session 208.

To access a computational service provider, an account is first set up or enabled for a user. For example, to enable a user according to one embodiment of the invention, the user is given a userID, a PIN and a smart card that stores the userID and secret code. In addition, a session is created for the user. As described below, a session can have none or more required services. It may be necessary to initiate some of the required services when the session is created. Once a service is initiated, it continues to be active regardless of whether the user is connected to the system. The balance of required services can be initiated when the user first logs in.

A user is not limited to one session. There can be multiple sessions associated with a user at any given time. Session database 220 contains records that identify the session(s) and service(s) within a session that are associated with a user. An enabled user can be removed from the system. When a user is removed from the system, all of the user's associated sessions are removed from the system and from session database 220. Services associated with the user's sessions are stopped as well.

Once a user is enabled to use a system, the user can log onto the system via network terminal 202. When session manager 206 is notified by authentication manager 204 that the user is connected to network terminal 202, session manager 206 notifies the user's session (i.e., the services that comprise a session). Session manager 206 consults session database 220 to identify and notify the session's services. For example, session database 220 includes information that identifies session 208 and services 230–238 that are included in session 208.

Session database 220 contains permanent session records and dynamic session records that identify sessions and the services associated with a session. Session database 220 can be one or more databases or data stores. For example, permanent session records can be stored in a configuration file while dynamic session records can be stored in memory in a database system. A permanent session record contains configuration information for a user and is typically created for a user at the time the user is enabled to use the system, for example. A dynamic session record identifies those services that are associated with a user. Dynamic session records identify the required services that are associated with a user session in a permanent session record as well as currently active services. The following contains a format for a permanent session record according to an embodiment of the invention:

sessionID serviceID serviceHost servicePort isLazy

The sessionID field uniquely identifies the session that contains the required service(s). The serviceID field uniquely identifies a service associated with the session identified by sessionID. The serviceHost and servicePort fields identify the server on which a service is running and the port on the server by which a service can receive communications. The isLazy field identifies the manner in which a service is initiated. For example, isLazy can specify that the service is to be started immediately upon the creation of a session, or that the service is to be started when the user first accesses the system. There may be multiple occurrences of the serviceID, serviceHost, servicePort and isLazy fields each occurrence identifying a required service associated with the session identified by sessionID.

The dynamic session record identifies the required services for the session and those services that are currently executing in the session. A session's required services are retrieved from the permanent session record, for example. A dynamic session record can identify zero or more services (required or otherwise) that are currently executing on behalf of a user.

The fields that are used to store information about a service in a dynamic session record depends on whether the service is a required service or a service. A required service that is currently active is also a current service. The format of a dynamic session record that identifies a session's required services is the same as the permanent session record format. The following identifies the format for a record associated with a currently executing service according to an embodiment of the invention:

sessionLink TCPSocketfd requiredServiceLink serviceID

The sessionLink field identifies the service's session. An open connection, or pipe, is established between session manager 206 and a currently executing service in a session. The open connection can be used to notify either session manager 206 or the service that the other has abnormally, or otherwise, terminated. In one embodiment of the invention, the open connection is a TCP socket connection which is identified by the TCPSocketfd field. However, it should be apparent that any form of reliable connection technology that could provide a notification that a connection is disabled or disappears could be used with embodiments of the invention.

The service has an identifier that is stored in the serviceID field. A currently running service can be linked to a required service. A link to a required service is identified by the requiredServiceLink. If there is no link to a required service, the requiredServiceLink is null.

The dynamic session record can also be used to store information about a connection to a network terminal (e.g., network terminal 202). The following contains the fields that identify the connection according to an embodiment of the invention:

sessionLink Status IPAddress

Multiple sessions can be associated with a user. The sessionLink field identifies the session to which the user attached to network terminal 202 is currently linked. The sessionLink can have as its value the sessionID value, for example. The status field identifies the connection status (i.e., connected or disconnected) of network terminal 202 to the session. The IPAddress field contains the interconnection network address of network terminal 202. An IP address is used in one or more embodiments of the invention. However, it should be apparent that alternative interconnection technologies may use alternate addressing schemes. For example, an asynchronous transfer mode (ATM) network might use a thirteen digit switch prefix/end point identifier.

This information can be used by session manager 206 to send a status message to network terminal 202. If network terminal 202 does not respond within a certain period of time, session manager 206 assumes that network terminal 202 is no longer in use by the user and sends a disconnect message to each of the services in the session.

Other information of which session manager 206 is aware include a list of the open connections (e.g., services having an open TCPsocketfd) to services and a mapping between open connections and sessions and the services within a session. This information can be compiled from the session records, for example.

The information available to session manager 206 can be used to locate a session. For example, given a service, it is possible to find a session that contains the service and/or the services that are contained within a session. Further, it is possible to locate a session that is associated with a given user or instance of network terminal 202 whether or not it is currently executing, for example.

Service Initiation

When session manager 206 receives a message from authentication manager 204 that a user is connected to network terminal 202, session manager 206 initiates those required services that are not currently active. Session manager 206 further notifies the currently active services to direct input/output (I/O) to network terminal 202. I/O can be expressed using a command protocol used to communicate with network terminal 202 and its peripheral devices. (Appendix A contains an example of a command protocol according to an embodiment of the invention.)

To initiate a service, session manager 206 accesses the server on which the service is to execute to start the service. For example, session manager 206 sends a request to a well-known port on the server and passes the sessionHost, sessionPort and sessionID for session manager 206. The server connects to network terminal 202 that is attached to the service and uses the server's native authentication and permissions to allow the user to access the server. For example, in a UNIX operating environment, a UNIX service could start with a "CDE Login" screen displayed at network terminal 202 to authenticate the user and ensure that the user wishes to connect to the service.

For session manager 206 to start a service on a server, it is given the privileges needed to start the service. It may be undesirable to give session manager 206 these privileges. Further, in current networking environments, servers may be running different operating environments. In this case, session manager 206 must be aware of each operating environment's procedures for initiating a service.

Alternatively, a session-aware application running on the server can perform the initiation and register the service with session manager 206. In this case, it is not necessary for session manager 206 to have the needed privileges. Further, session manger 206 does not have to implement a centralized model for initiating services on multiple operating environments. The responsibility for initiating services is left to the session-aware applications that are running in the different operating environments. A session-aware server application has knowledge of session manager 206 (e.g., has the sessionID, sessionHost and sessionPort of session manager 206) and its interfaces (e.g., message formats).

The session-aware server application can initiate a service in response to a request received from session manager 206. Session manager 206 sends an initiate message to the server application that possesses the permission to start services in the server's operating environment. The server application initiates the service for session manager 206 and responds to session manager 206 with a valid sessionID. On the UNIX and NT systems, for example, the sessionID can be made available in the operating environment. Services such as video windows might start in this manner, for example.

Alternatively, the session-aware application can contact a service to obtain its permission in the form of a cryptographically signed authorization. The server application can transmit the sessionID and the signed authorization to session manager 206. If the session-aware application contacts session manger 206 without an authorization but with a description of the service, session manager 206 could request approval from network terminal 202 to ensure that the user authorized the service. If the user responds affirmatively, the service is added to the session.

Session Manager Messages

Session manager 206 receives and generates messages to manage the services within a session. Techniques other than those described herein can be used for initiating services. If session manager 206 initiates a service, it sends an initiate message to the server (or session-aware server application). Session manager 206 can generate an initiate message to start required services identified in session database 220, for example. As another example, session manager 206 can send an initiate message to re-activate a required service that it has determined (e.g., via an open TCP connection between session manager 206 and the service) has terminated.

Session manager 206 receives a connect message when a user of network terminal 202 successfully attaches to the system. In response to the connect message, session manager 206 verifies that all of the required services are started, and starts those that are not running. Session manager 206 sends a message (e.g., a connect message) to the services in the session to direct I/O to network terminal 206.

When a disconnect message is received, session manager 206 sends a disconnect message to each one of the services in the session directing them to terminate sending I/O to network terminal 202.

Session manager 206 can send status messages to network terminal 206 periodically to ensure that network terminal 202 is still connected. For example, session manager 206 can examine session database 220's dynamic session records to identify each session that is currently connected to a network terminal. That is, session manager 206 can examine the status field associated with a network terminal in a dynamic session record in session database 220. Session manager 206 sends a status request (e.g., a "ping") to each network terminal that is connected with a session. If an answer is not received from network terminal 202 within a certain period of time (e.g., 20 seconds) for a particular session, session manager 206 assumes that the session is disabled and it sends a disconnect message to each service in the session instructing them to terminate display functions.

Network terminal 202 responds to the status (e.g., ping) request from session manager 206 with either a "Card In" or "Card Out" status. If a "Card Out" status is received from network terminal 202, session manager 206 sends a disconnect message to each of the session's services.

If the "Card In" status is sent in response to a status request, network terminal 202 also indicates the number of insertions of the card in card reader 216, the number of seconds since a card insertion, and the cardID. The cardID is, for example, the value of sessionID for the user's session. Session manager 206 retains at least the last status information received from network terminal 202 to compare the new status information against the previous status information. If, for example, the number of insertions or the number of seconds for insertion differs from the last status information, session manager 206 considers the session to be disabled. In this case, session manager 206 sends a disconnect message to the session's services.

When a service is started by, for example, a session-aware server application, a service connect message is sent to session manager 206. If the service has the proper authorization, session manager 206 adds the service to the list of services for the session and sends a message to the service to direct I/O to network terminal 202.

Authentication Manager

The authentication manager is responsible for ensuring the legitimacy of a user and associating a user with a session(s). During the initialization process (which is described in more detail below), an authentication exchange takes place to authenticate the user in one embodiment of the invention. Authentication can be include any mechanism that verifies the identify of the user to the system. For example, a key password can be entered or biometrics data can be collected to authenticate the user.

Authentication database 218 contains user and session information that can be accessed by authentication manager 204. In one embodiment of the invention, the format of a record contained in authentication database 218 is as follows:

userID secret PIN sessionHost sessionPort sessionID

The userID and secret fields contain the same values as those stored in a user's smart card. The userID and secret values are typically established when the user is enabled to use the system, for example. In one embodiment of the invention, the secret field contains a 128-bit value. The PIN field is the personal identification number (PIN) that is known to the user and requested by authentication manager 204 during authentication. The userID, secret and PIN values are used to authenticate a user. Authentication database 218 could contain other information such as a password or biometrics data, if they were used to authenticate a user.

The sessionHost field identifies the computational service provider (e.g., a server) that is executing session manager 206 that is managing the user's current session. The sessionPort field identifies the port for communicating with session manager 206. The sessionID field contains a unique identifier for session manager 206. If authentication is successful, the sessionHost, sessionPort and sessionID fields are used to notify session manager 206 of the user's location at the network terminal 202.

Figure 6:
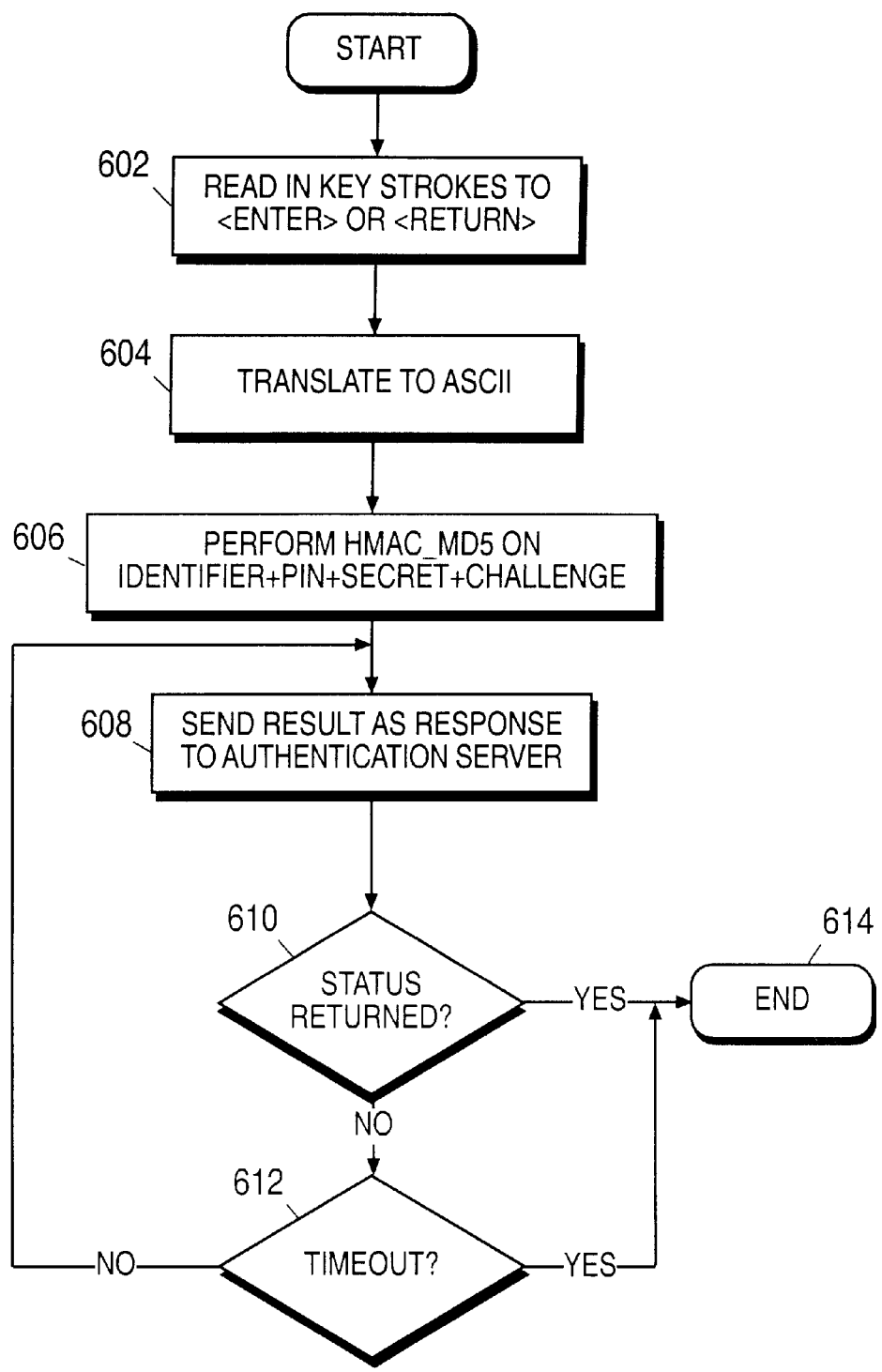
FIG. 6 provides a challenge process flow according to an embodiment of the invention.

In an embodiment of the invention, a challenge mechanism is used to authenticate a user. (FIG. 6 provides a challenge process flow according to an embodiment of the invention.) Authentication manager 204 sends a challenge to network terminal 202 to verify the authenticity of the user. Network terminal 202 prepares the challenge response, and returns it to authentication manager 204. If the response to the challenge is as expected, the user is verified to authentication manager 204.

Figure 5A:
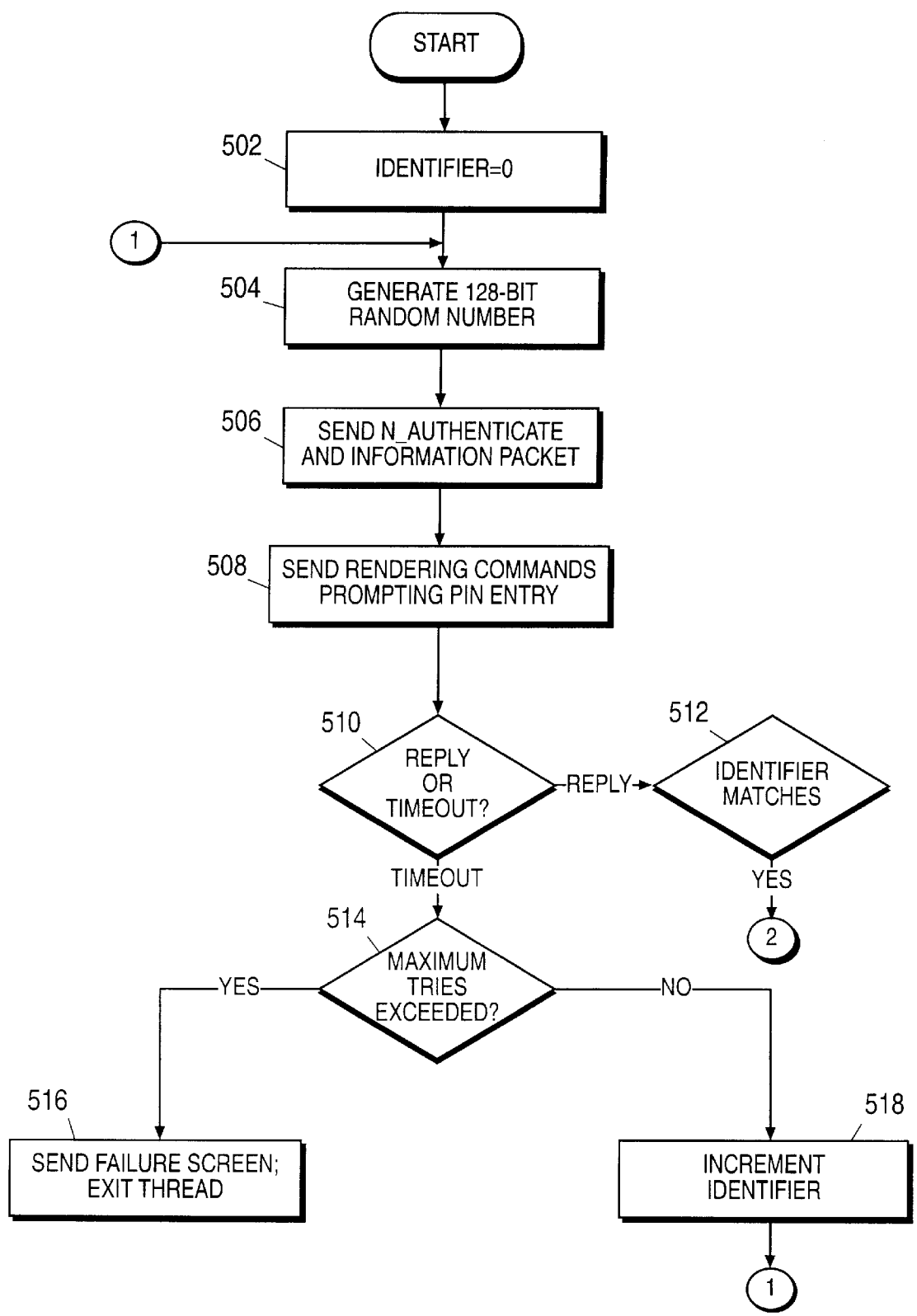
FIGS. 5A–AB provide an authentication process flow according to an embodiment of the invention.

FIGS. 5A–AB provide an authentication process flow according to an embodiment of the invention. The authentication process can be repeated more than once until authentication is successful or the number of repetitions, or rounds, exceeds a certain number. At step 502, an identifier that represents the number of the authentication round is initialized to zero. At step 504, a random number is generated that is used as the challenge number. At step 506, authentication manager 204 sends an N_AUTHENTICATE command to network terminal 202 as well as a packet of information for the authentication process.

In one embodiment of the invention, the following information is sent in conjunction with the N_AUTHENTICATE command:

code identifier length valueSize value

The code field identifies the type of information contained in the information packet. For example, a value of "1" indicates that the information packet contains a challenge. The identifier field contains the value (i.e., the round indicator) that was generated at step 502. The length field identifies the length of the information packet. The value field contains the random number, or value of the challenge, generated in step 504. The valueSize identifies the size of the value field (e.g., 128 bits).

At step 508, authentication manager 204 sends rendering commands to network terminal 202 prompting the user for the user's PIN. At step 510, authentication manager 204 waits for a response from network terminal 202 or a timeout.

If a timeout is detected at step 510, processing continues at step 514 to determine whether the maximum number of rounds has been exceeded. If not, processing continues at step 518 to increment the identifier and processing continues at step 504 to begin a new authentication round. If it is determined, at step 514, that the maximum number of rounds has occurred, processing continues at step 516 wherein authentication manager 204 sends rendering commands to network terminal 202 indicating a failure and the authentication process ends. Rendering commands can be, for example, part of a command protocol used to communicate with network terminal 202 and its peripheral devices.

A challenge routine includes commands sent by authentication manager 204 to network terminal 202 to capture the PIN entry by the user and generates a response. Network terminal 202 generates a response value that is the output of a hash function (i.e., a hash value or challenge response) from an input including the user's PIN, the value of the identifier, the value of the secret stored in the user's smart card and the value of the challenge (e.g., the random number generated in step 504).

A hash function can take variable-length input and convert it to a fixed-length output (a hash value). One example of a hash function takes the input and returns a byte consisting of the exclusive-or (XOR) of all the input bytes. There are many other examples of hash functions that can used with embodiments of the invention. The hmac_md5 function (RFC2104) is one example of a hashing function that is used in an embodiment of the invention to generate a response.

The following packet format is used by network terminal 202 to send the response to authentication manager 204 according to one embodiment of the invention:

code identifier length valueSize value userID

The code field is set to a value of "2" which indicates that the information packet contains a challenge response. The value field contains the challenge response (e.g., the result of a hashing function). The userID field contains the user's userID.

If authentication manager 204 determines (at step 510) that it received a response from network terminal 202, processing continues at step 512 to determine whether the identifier returned by network terminal 202 matches the identifier generated by authentication manager 204. If so, processing continues at step 520 to examine the response returned by network terminal 202.

At step 520, authentication manager 204 determines whether the challenge response matches the response expected by authentication manager 204. For example, authentication manager 204 can generate a hash value using its identifier, PIN, secret and challenge values. If the hash value generated by authentication manager 204 matches the challenge response generated by network terminal 202, authentication is partially successful. Authentication manager also verifies that the interconnection network address of network terminal 202 and the user's userID are valid. If the challenge response, interconnection network address and userID are verified, authentication is successful. If not, authentication failed.

If authentication is successful, processing continues at step 528 to send an N_AUTHENTICATE command. The format of the command, according to an embodiment of the invention, is as follows:

code identifier length

The code field contains a value of "3" to indicate that the user was successfully authenticated. Processing continues at step 530 to send rendering commands to network terminal 202 indicating that session manager 206 is connecting the user to one of the user's sessions. At step 532, authentication manager 204 notifies session manager 206 that the user is connected to the system via network terminal 202. Authentication manager 204 sends the interconnection network address of network terminal 202 and session manager 206's sessionID to the server that is executing session manager 206 (i.e., the server identified in the sessionHost field of the user's authentication database record) at step 532.

If authentication failed, processing continues at step 522 to send an N_AUTHENTICATE command. Like a successful authentication, the N_AUTHENTICATE command includes a code field that indicates the status of the authentication process. A code value of "4" is used, for example to indicate that authentication failed. Processing continues at step 524 to send rendering commands to network terminal 202 indicating that the authentication failed and instructing the user to remove the smart card from card reader 216.

The authentication process ends at step 526.

Figure 5B:
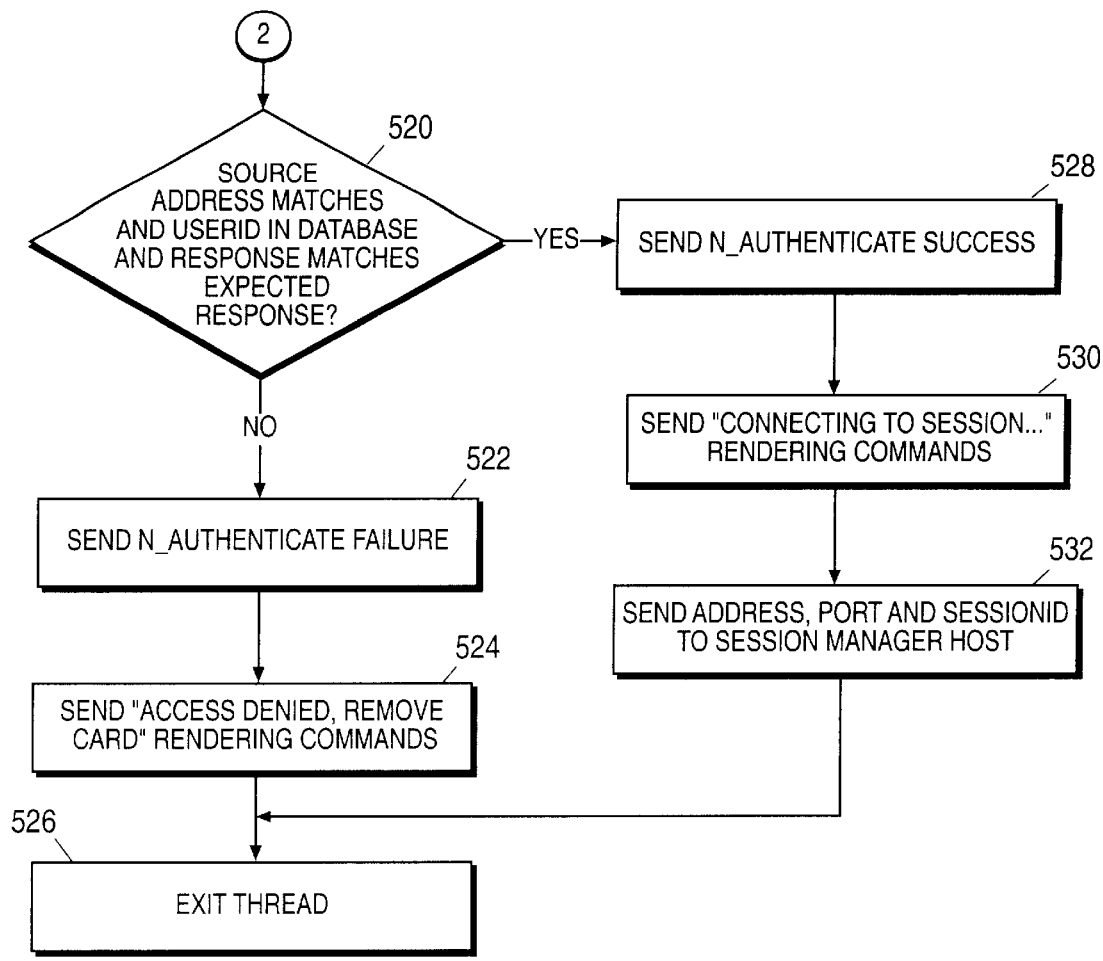

The process described with reference to FIGS. 5A–5B is one example of an authentication process. It should be apparent that other authentication techniques can be used with embodiments of the invention. In an alternate embodiment the user is not requested to enter a PIN. The user's card in card reader 216 is enough to authenticate the user. The userID and secret value can be hashed with the identifier and the challenge received from authentication manager 204 to generate a response to a challenge by authentication manager 204. In this way, a user can attach to the user's services simply by inserting a card containing valid information into card reader 202.

Further, it should be apparent that embodiments of the invention can be used wherein no authentication of a user is performed. For example, in a trusted or secure environment there may be no need to verify the authenticity of a user. Therefore, in one embodiment of the invention, a user is connected to a session without first being authenticated by authentication manager 204. The user need only provide an identification (e.g., userID), for example. If the user provides a valid userid, the user is given access to the session that is associated with the userID.

When the user disconnects from network terminal 202, authentication manager 204 is informed and informs session manager 206 of the disconnection. For example, when the user removes the smart card from card reader 216, card reader 216 informs network terminal 202. Network terminal 202 informs authentication manager of the disconnection. Authentication manager 204 informs session manager 206 that the user has disconnected from network terminal 202. Session manager 206 notifies each of the services in the user's session.

Challenge Routine

The authentication process can include a challenge initiated by authentication manager 204. FIG. 6 provides a challenge routine process flow for handling a challenge according to an embodiment of the invention. The challenge routine executes on network terminal 202 in response to a challenge command received from authentication manager 204.

At step 602, the key entry received from the user is read until a return or enter key is pressed. The key entry is translated to ASCII characters at step 604. At step 606, a hash function is used to generate a hash value, or challenge response, from the concatenation of the identifier, PIN, secret, and challenge values. The challenge response is sent to authentication manager 204 at step 608. At step 610, network terminal 202 awaits a response from authentication manager 204 or a timeout. If a response or a timeout occurs, the challenge routine ends at step 614.

Network Terminal Initialization

Network terminal 202 performs some initialization when it is first turned on. While a user is not using network terminal 202, network terminal 202 can be in a dormant state if it is powered on. A user can awaken network terminal 202 from its dormant state using one of the techniques described herein, for example. It should be apparent that other techniques can be used to awaken network terminal.

Figure 3:
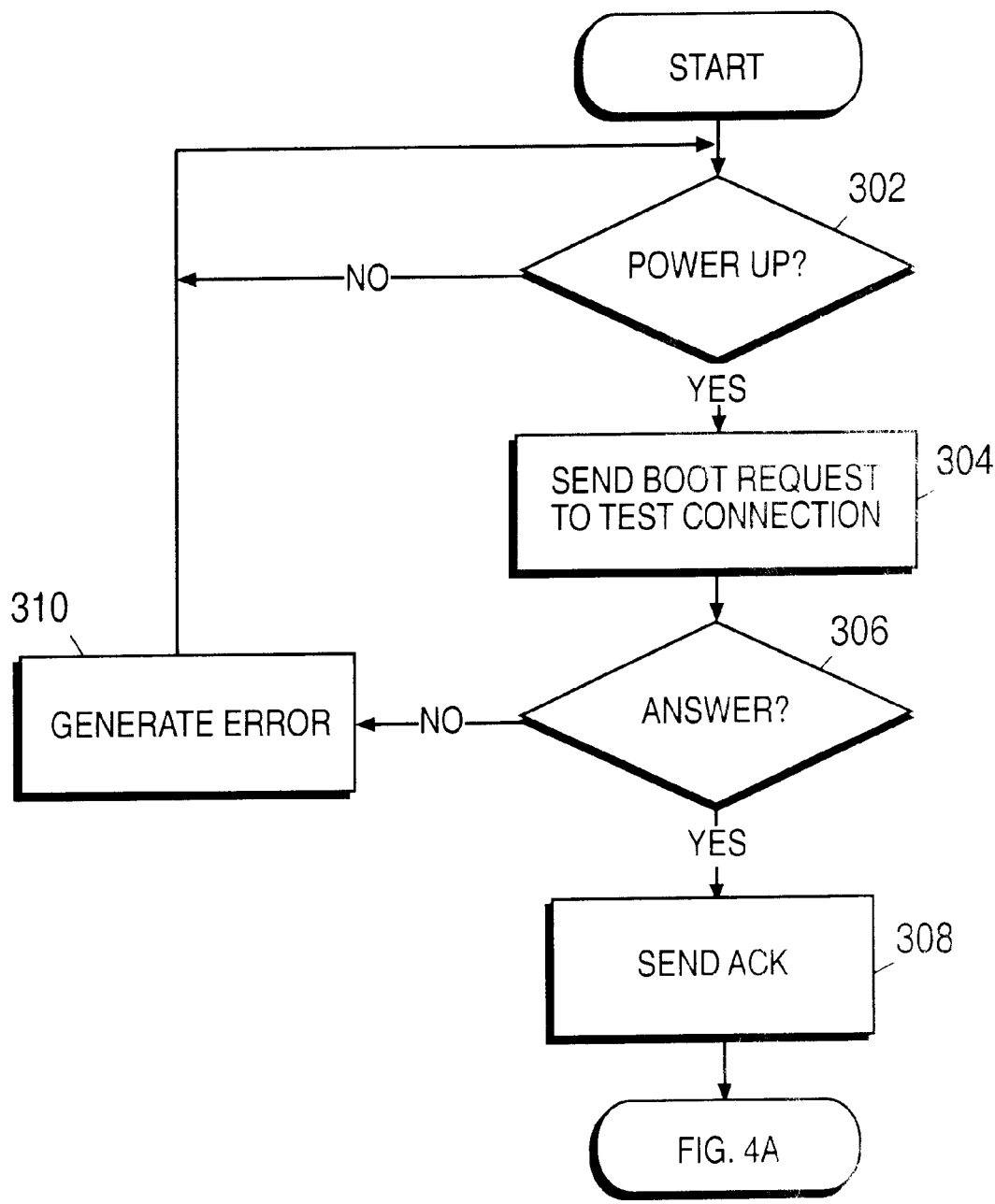
FIG. 3 provides a process flow for initializing a network terminal in response to a power up operation according to an embodiment of the invention.

FIG. 3 provides a process flow for initializing network terminal 202 in response to a power up operation according to an embodiment of the invention. At step 302, a determination is made whether a power up operation has occurred. If not, processing continues to wait for a power up operation. At step 304, a request is generated by network terminal 202 to the network to test the network connection. At step 306, a determination is made whether a response is received. If not, processing continues at step 310 to generate an error and processing continues at step 302 to await a power up operation.

Figure 4A:
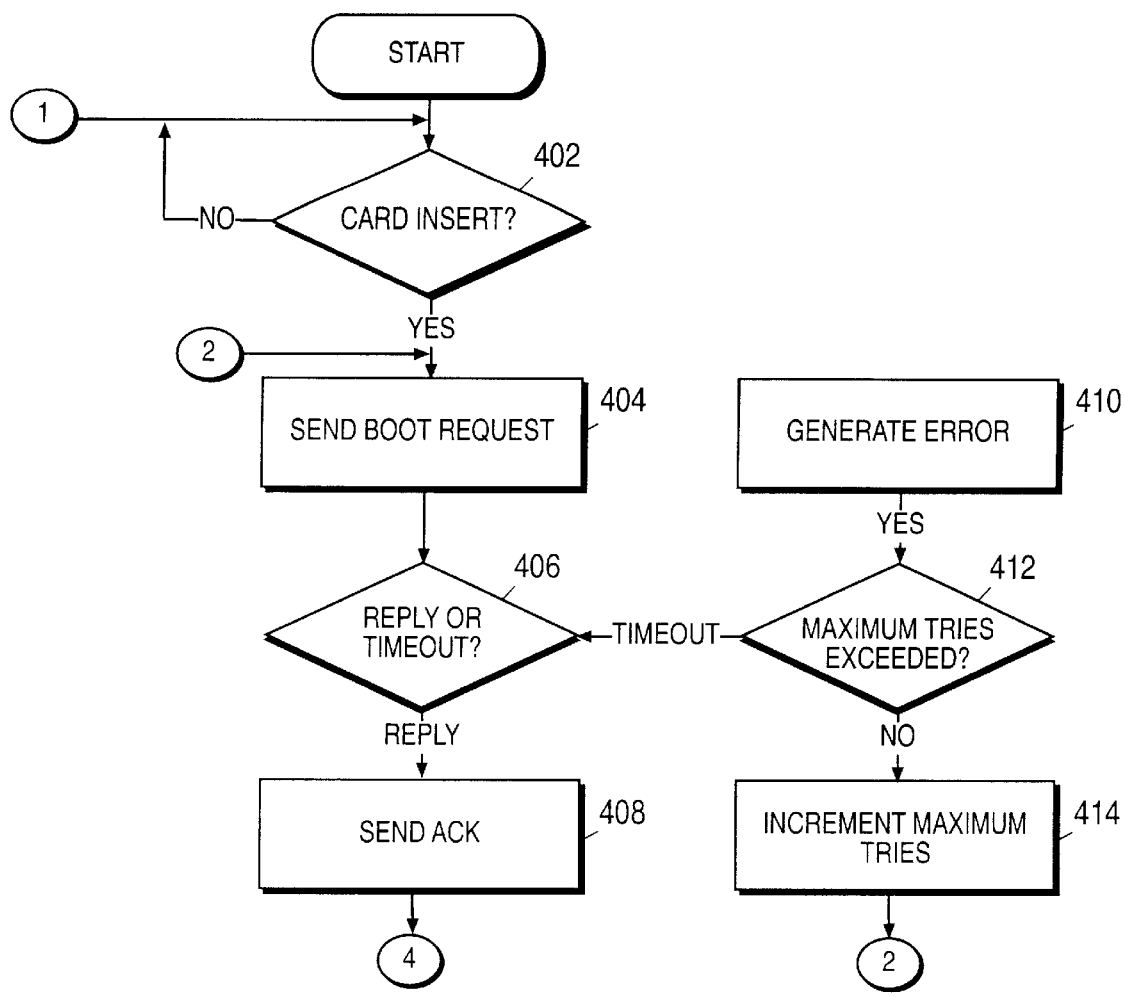
FIGS. 4A–4C provide a process flow according to an embodiment of the invention for initializing network terminal 202 in response to an awaken operation.

If it is determined, at step 306, that an answer is received, processing continues at step 308 to send an acknowledge (an ACK) message and initialization of network terminal 202 can continue at step 402 of FIG. 4A.

Figure 4B:
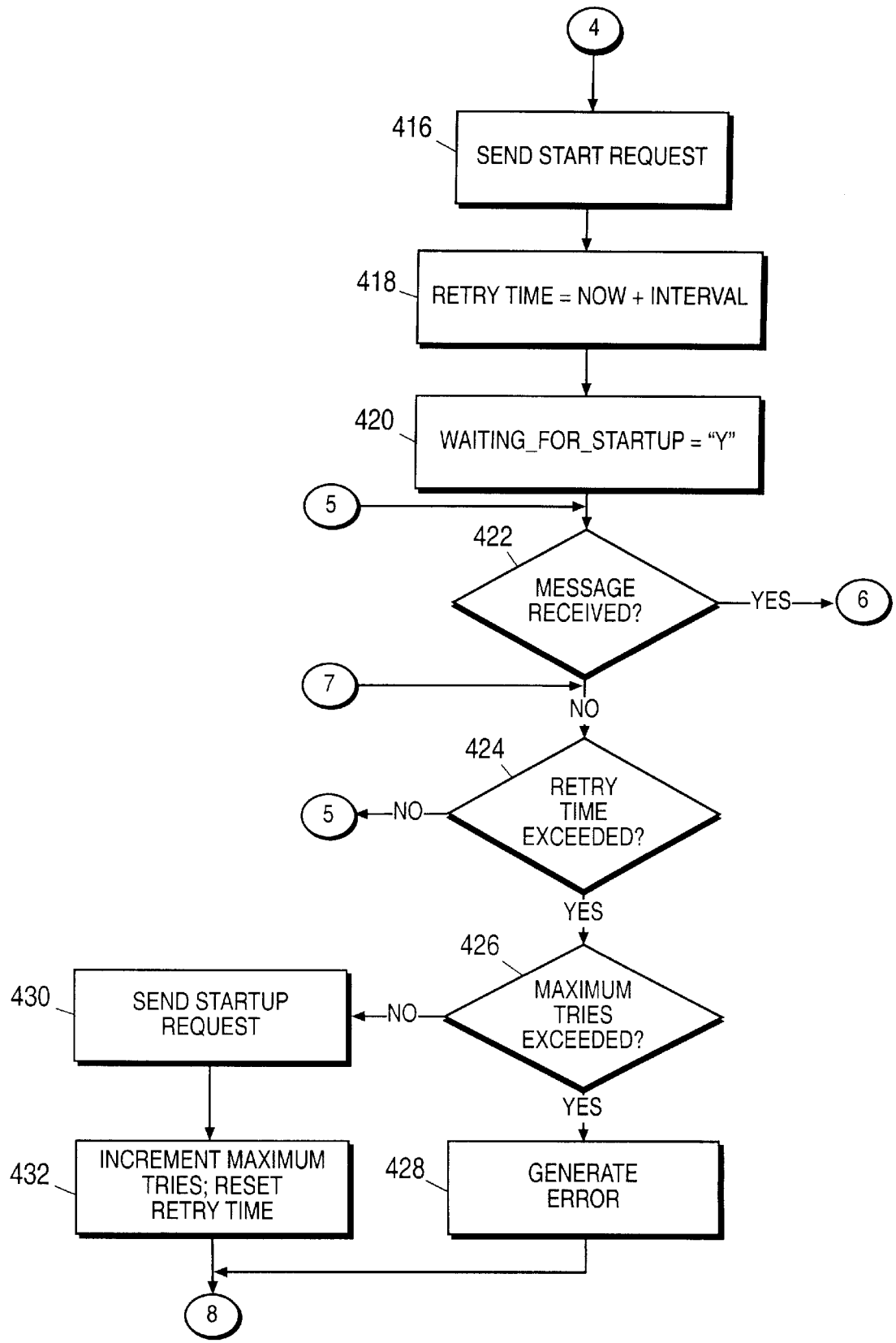
Figure 4C:
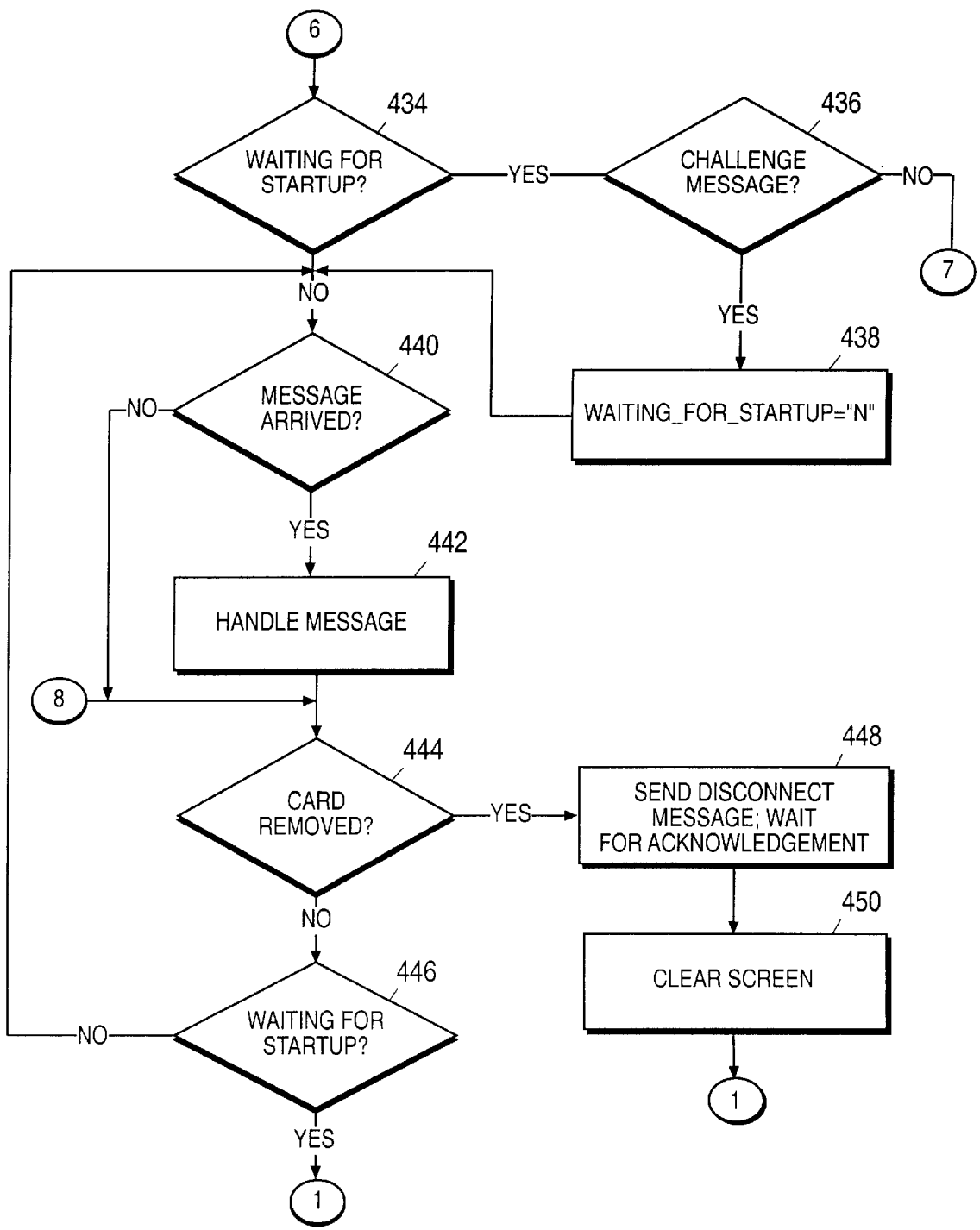

FIGS. 4A–4C provide a process flow according to an embodiment of the invention for initializing network terminal 202 in response to an awaken operation. Referring to FIG. 4A, network terminal 202 waits for notification of the awaken operation. In an embodiment of the invention, the awaken operation is the insertion of a user's smart card in card reader 216.

If it is determined that a smart card is inserted in card reader 216, processing continues at step 404 to send a request to obtain the interconnection network addresses of authentication manager 204 and network terminal 202. Alternatively, a user's smart card can be preprogrammed with the interconnection network addresses. Network terminal 202 can read the interconnection network addresses from the smart card via card reader 216, for example.

At step 406, network terminal 202 awaits a response or a timeout. If a timeout occurs, processing continues at step 412 to determine whether the maximum number of tries has been exceeded. If the maximum number of tries has been exceeded, processing continues at step 410 to generate an error. If the maximum number of tries has not been exceeded, processing continues at step 414 to increment the number of tries and processing continues at step 404 to resend the request for the interconnection network addresses.

When a response to the request is received, processing continues at step 408 to send an ACK. Processing continues at step 416 of FIG. 4B. At step 416, network terminal 202 sends a startup request to authentication manager 204. At step 418, a retry time is set in which network terminal 202 waits for a response to the startup request. At step 420, a variable is set to indicate that network terminal 202 is waiting for a response to the startup request. At step 422, network terminal 202 waits for a response to the startup request.

If it is determined that a response is not received, processing continues at step 424 to determine whether the retry time as been exceeded. If not, processing continues at step 422 to wait for a response. If the retry time has been exceeded, processing continues at step 426 to determine whether the maximum number of tries has been exceeded. If not, processing continues at step 428 to generate an error and return to step 416 to resend the startup request. If not, processing continues at step 430 to increment the number of tries and reset the retry time. At step 432, the startup request is resent and processing continues at step 444 to determine whether the card has been removed from card reader 216.

If it is determined, at step 422, that a response was received, processing continues at step 434 of FIG. 4C. At step 434, network terminal 202 examines the variable initially set in step 420 to determine whether it is waiting for a response to the startup request. If so, processing continues at step 436 to determine whether the response is a challenge message. If not, processing continues at step 424 to repeat the startup request if the maximum number of tries has not been exceeded. If it is determined, at step 436, that a challenge message has been received, processing continues at step 438 to set the waiting_for_startup variable is set to no (i.e., "N"). Processing continues at step 440 to process the challenge request at steps 440 and 442. The challenge request can be handled as described above with reference to FIGS. 5A–5B and 6, for example.

If it is determined, at step 434, that network terminal 202 is not waiting for a response to a startup request, processing continues at steps 440 and 442 to handle the message (e.g., rendering commands to display output generated by service 234).

At step 444, a determination is made whether the user has removed the smart card from card reader 216. When the user removes the card from card reader 216, network terminal 202 sends a disconnect message to authentication manager 204 at step 448. Network terminal 202 waits for an acknowledgment (ACK) message from authentication manager 204. When the ACK message is received, network terminal 202 clears the screen, at step 450, and returns to step 402 to wait for another user to insert a smart card in card reader 216.

If it is determined, at step 444, that the user has not removed the card from card reader 216, processing continues at step 446 to determine whether network terminal is waiting for a response to its startup request. If so, processing continues at step 422 to determine whether a response has been received. If network terminal is not waiting for a response from a startup request, processing continues at steps 440 and 442 to process any messages sent to network terminal 202.

Message Format

In an embodiment of the invention, a connection to network terminal 202 is established via a user datagram protocol (UDP) port. That is, packets are sent via a UDP connection and received at a destination UDP port. The destination UDP port uniquely identifies the connection. Packet length and checksum information are provided by the UDP header. Buffer size fits in an Ethernet Maximum Transfer Unit (MTU) with IP/UDP headers. Data is sent over the network in network byte order (big-endian).

It should be apparent that other protocols can be used in place of UDP. For example, protocols such as an ATM AAL5 (AAL or ATM Adaptation Layer) can be used.

Thus, a method and apparatus for session management and user authentication has been described. Particular embodiments described herein are illustrative only and should not limit the present invention thereby. The invention is defined by the claims and their full scope of equivalents.

APPENDIX A

Command Protocol Example

Rendering Commands
Wire Protocol Command Formats

All data is sent over the network in network byte order
(big-endian) and bit-fields are packed from MSB to LSB.
The basic rendering command format is:
<COMMAND:8> <SEQUENCE:24> <X:16> <Y:16> <WIDTH:16> <HEIGHT:16> <Info>

| COMMAND | Code | <Info> Description |
|---|---|---|
| Set | 0xA1 | WIDTH*HEIGHT of 32-bit values <X,B,G,R> [WIDTH*HEIGHT <= 512 pixels] |
| Fill | 0xA2 | one 32-bit value <X,B,G,R> |
| Glyph | 0xA3 | one 32-bit value <X,B,G,R>, (HEIGHT * ceiling(WIDTH/8)) bytes of bitmap [i.e. each line padded to 8 bits] [WIDTH*HEIGHT <= 2048 pixels]; the entire command is padded to the next 32-bit boundary |
| Copy | 0xA4 | <FROM_X:16> <FROM_Y:16> |
| Bilevel | 0xA5 | two 32-bit values c0, and c1, <X,B,G,R>, followed by (HEIGHT * ceiling(WIDTH/8)) bytes of bitmap [i.e. each line padded to 8 bits] [WIDTH*HEIGHT <= 2048 pixels]; the entire command is padded to the next 32-bit boundary |
| Set24 | 0xA6 | WIDTH*HEIGHT of packed 24-bit values <B,G,R> [WIDTH*HEIGHT <= 512 pixels] padded to the next 32-bit boundary |
| Set YUV Image | 0xA7 | <SOURCE_W:16> <SOURCE_H:16> <RFU:8> <LUMA_ENCODING:8> <CHROMA_SUB_X:3> <CHROMA_SUB_Y:3> followed by (SOURCE_W * SOURCE_H) pixels Y [luma] with each line padded to a byte boundary, and (ceiling(SOURCE_W / x_subsample) * ceiling(SOURCE_H / y_subsample)) bytes each of 8-bit signed U and V [chroma] in CCIR-601 value encodings; the entire command is padded to the next 32-bit boundary; [SOURCE_W * SOURCE_H <= 1024 pixels]; [SOURCE W <= WIDTH]; (SOURCE_H <= HEIGHT] |
| Set Cursor | 0xA9 | two 32-bit values c0, and c1, <X,B,G,R>, followed by two sets of (HEIGHT * ceiling(WIDTH/8)) bytes of bitmap [i.e. each line padded to 8 bits] [WIDTH & HEIGHT <= 64 pixels each]. The first bitmap is the pixel values, the second is the per-pixel mask. The entire command is padded to the next 32-bit boundary. |
| Set Pointer | 0xAA | <INDEX:8> <DIM:2> <PAD:6> { <Z:16> { <P:16> <R:16> <H:16> <PAD:16> } } \| <PAD:16> note that all values are signed, 2's compliment. Angular values range from −180 to +180-(1 lsb)=+179.9945 (degrees over full range. WIDTH, HEIGHT are ignored. |
| Set Key Locks | 0xAB | X, Y, WIDTH, HEIGHT ignored. <INDEX:8> <LOCKS:8> <PAD:16> |
| Damage Repair | 0xAC | <EPOCH:32> <PAD:8> <SEQ:24> |
| Play Audio | 0xB1 | X, Y, WIDTH, HEIGHT are encoded as follows: X:4 audio sequence number X:12 interleave offset Y total sequence length-1 WIDTH:4 mixer mode specifies the # of channels to include in the standard mix. Channel numbers above this |

APPENDIX A-continued

Command Protocol Example

|  |  |
|---|---|
|  | number are sent raw and not combined with any other channel if the terminal has insufficient channels to cover the request. |
| WIDTH:12 | packet len in samples max 2000 bytes |
| HEIGHT:4 | number of channels-1 |
| HEIGHT:12 | interleave size-1 |
|  | The header is followed by the specified number of samples X number of channels × 16 bits. The entire command is padded to 32 bits. |

The sequence number is incremented for each command. Sequence numbers may not be all zero except for a epoch changing flush command, described below. Rectangles may not wrap. I.e. x+width < 0x10000 and y+height < 0x10000.

One additional informational command is defined with a different format:

<COMMAND:8> <SEQUENCE:24> <EPOCH:32> <FILL:16 * 8>

| COMMAND | Code |
|---|---|
| Flush | 0xAF |

The sequence number of a flush command is the same as the sequence number of the previous command, with the exception of epoch changes (see description below). That is, sequence numbers only increment when pixels change or the epoch changes.

Command Descriptions

| Command | Description |
|---|---|
| Set | Set the rectangle defined by <x, y> <width, height> to the pixel values that follow. There is one pixel value for each pixel in the region. The layout is by rows; i.e. there are "width" pixel values for pixels at <x, y> through <x+width-1, y> followed by pixels at <X y+1> through. <x+width-1, y+1>, etc. <0,0> describes the upper left corner. |
| Fill | Set all pixels in the rectangle defined by <x, y> <width, height> to the single 32-bit value. |
| Glyph | The 32-bit value is placed in the pixel location corresponding with each one bit in the bitmap, positions associated with zero bits are unchanged. The bitmap is laid out by rows (y, y+1, . . .), using MSB to LSB in each byte. |
| Copy | Copy the rectangle defined by <from_x, from_y> <width, height> to the rectangle defined by <x, y> <width, height>. The client must ensure overlapping regions are copied correctly (e.g. see Solaris bstring(3)). |
| Bilevel | The two 32-bit values c0 and c1, are placed in the pixel location corresponding with each zero and one bit, respectively, in the bitmap. The bitmap is laid out by rows (y, y+1, . . .), using MSB to LSB in each byte. |
| Set24 | Set the rectangle defined by <x, y> <width, height> to the pixel values that follow. The pixel values are packed such that there are four pixels defined by three 32-bit values thusly: <bgrb,grbg,rbgr>. If width is not a multiple of four, the end is packed the same as above with the remaining values and padded to the nearest 32-bit value. There is one pixel value for each pixel in the region. The layout is by rows; i.e. there are "width" pixel values for pixels at <x,y> through <x+width-1, y> in ((3 * width + 3) / 4) 32-bit words followed by pixels at <x, y+1> through <x+width-1, y+i>, etc. <0,0> describes |

APPENDIX A-continued

Command Protocol Example

| | |
|---|---|
| Set YUV Image | the upper left corner.<br>Set the rectangle defined by <x, y> <width, height> to the pixel values provided as follows. The image in CCIR/ITU.BT-601 Y'CbCr (or YUV) format of source_w by source_h pixels is decoded to RGB. The chroma elements may be subsampled in the horizontal and/or vertical dimensions as specified and must be up-sampled prior to the transformation. The values of CHROMA_SUB_X and CHROMA_SUB_Y (x_subsample and y_subsample, respectively) are encoded as follows:<br>    0 - No chroma values; monochrome image.<br>    1 - Subsample by 1 (i.e. no subsample)<br>    2 - Subsample by 2<br>    3 - Subsample by 4<br>    4–7 - Undefined/reserved<br>LUMA_ENCODING values are:<br>    0 - y (luma) is specified by 8-bit unsigned data<br>    1 - Y (luma) consists of 4-bit quantized DPCM values (see below)<br>    2,3 - Undefined/reserved<br>RFU is reserved for future use and must be 0. After decoding, the RGB image is scaled up as necessary to width by height pixels. The resulting image is put on the display at location <x, y>.<br>Note: if both CHROMA_SUB_X and CHROMA_SUB_Y are zero, the image is monochrome (luma only) and no U or V data is present. It is invalid to have one set to zero and the other non-zero.<br>The component order is Y (or CCIR-601 Y'), U (CCIR-601 Cb), and then V (CCUR-601 Cr) |
| Set Cursor | This command sets the appearance of the local display cursor (moved and reported by Pointer[0]). The cursor is a maximum of a 64×64 block, but may be any size less than that. If the mask value for a particular pixel is '1', the corresponding cursor pixel is displayed; if the mask is '0', the cursor is transparent at that location. When the mask is '1', the pixel value is 'c0' when the value is '0', and 'c1' when the value is '1'. If the mask is zero, the pixel value should also be zero. A mask of zero and a pixel value of one is reserved for future expansion.<br>WIDTH and HEIGHT may be zero, indicating not to draw a cursor (equivalent to a mask of all zeros). Pointer tracking continues to work normally.<br>X and Y denote the 'hot spot' for the cursor; e.g., on what pixel of the cursor image events are to be reported. This is primarily used for stopping the cursor on the edges of the display. X [0, WIDTH], Y [0, HEIGHT]. |
| Set Pointer | Sets the location of a pointer. Pointer[0] is usually set table (mouse or touchscreen) and is the 2-D screen cursor. This command is provided for applications that insist on setting their pointer, or for applications that need relative pointers (e.g. reset the cursor to its previous position). As such, there are a few restrictions:<br>  . setting the pointer may not work (e.g. a joystick) at all<br>  . the pointer value may be clipped arbitrarily to match the pointer device or the screen<br>  . the user can continue to move the |

APPENDIX A-continued

Command Protocol Example

|  |  |
|---|---|
|  | pointer once it is set, but that is reported using a 'Pointer State' status message.<br>. the behavior of resetting the pointer for pseudo-relative mode could cause different behaviors with different devices; e.g. a touch screen, is only settable when the user is not 'dragging'.<br>Pointers are allowed to have up to six dimensions. The number of dimensions and the size of the command are set using the DIM bits. All pointer values are signed, 2's compliment. |
| Set Key Locks | This command sets the lock values for an <INDEX>'ed keyboard. Locks generally correspond to lights on the keyboard that are software controllable. If a lock condition is to be indicated, then the bit should be set in the mask, otherwise, the bit should be cleared. Since some keyboards may implement locks locally (e.g. mechanically), setting a lock may not have an affect. Keys from the keyboard should always be interpreted from the state reported by the keyboard. On the other hand, the host is required to issue a Set Key Lock command on reception of a locked keycode, if that is what the interface dictates, because both normal keyboards and the terminal do not alternate to handle locking locally. This is because the terminal does not understand the keyboard or desired user interface semantics. The key lock bitmap is from the USB class definition for Boot Keyboards:<br>    0x01    Num Lock<br>    0x02    Caps Lock<br>    0x04    Scroll Lock<br>    0x08    Compose<br>    0x10    Kana<br>All other bits are reserved -- ignored on read, zero on set. |
| Damage Repair | This informs the client that all damage messages for sequence number SEQ in epoch EPOCH and earlier have been processed and repair data sent. (see the Damage back-channel command) PAD must be 0. X, Y, WIDTH, and HEIGHT must be 0; |
| Play Audio | This plays 48kHz audio samples, and may be imbeded in a graphics command stream. An undefined number of streams are received by the terminal on a first-come-first-served basis. Streams are allocated on an as-needed basis and are broken down when buffer starvation occurs (there is no data to play when its time comes -- partially received buffers are error concealed and played). The terminal corrects for timebase drift. Data is sent in an interleaved manner to aid in network error concealment. A sample sequence is split into an interleave size and at most 1+(sequence size)/(interleave size) samples are emmitted per packet. The samples are selected as follows:<br>sample sequence [sample_size];<br>int seq_number = 0;<br>while (1) {<br>  get_samples(sequence, sample_size);<br>  for (i = 0; i < interleave_size; i++) {<br>    interleave_offset<br>      = random_select(0 . . . interleave_size);<br>    packet=new_packet (seq_number, sample_size,<br>        num_chan, num_chan,<br>        interleave_size, |

APPENDIX A-continued

Command Protocol Example

| | |
|---|---|
| | interleave_offset); |
| |     for (j = interleave_offset; j < sample_size; |
| |       j += interleave_size) |
| |       emit(packet, sequence[j]); |
| |     send_packet (packet); |
| |   } |
| |   seq_number = (seq_number+1)% 16; |
| | } |
| | note that the order that the packets are sent can (and probably should) be random. For example, for an interleave of 3 and and sequence size of 8, the following three packets could be sent: |
| | (samples)   (0  1  2  3  4  5  6  7) |
| | pkt 1, off 1:     1         4         7 |
| | pkt 2, off 0:  0        3         6 |
| | pkt 3, off 2:       2        5 |
| | The sequences are numbered so that the terminal knows when to error conceal and emit a sample sequence. |
| | Samples are 48kHz, 16 bit linear, and may contain up to 16 channels. For example, a 5-channel sample would take 10 consecutive bytes. |
| | There is no definition for the number of audio channels supported by the terminal, nor any way to find out, but up to 16 channels can be sent at once. Since there may be a different number of channels sent than the terminal supports, the concept of a standard mix is introduced for the first 8 channels. This may be disabled by setting the "MIX" field that guarantees certain indexed channels are not to be mixed together. The last 8 channels are mixed in the same scheme as the first 8 so that sound may be heard. If there are sufficient channels, then results are terminal setup dependent. |
| | The standard assigned channels are as follows: |
| |                         channel-> |
| | # chan  0        2   3   4   5   6   7 |
| | 1    mono |
| | 2    1   r |
| | 3    1   r    sw |
| | 4    1   r    rl   rr |
| | 5    1   r    rl   rr   sw |
| | 6    1   r    rl   rr   sw   cf |
| | 7    1   r    rl   rr   sw   cf   top |
| | 8    1   r    rl   rr   sw   cf   cl   cr |
| | (l=left, r=right, r[lr]=rear{left,right} sw=subwoofer, cf=center fill, c[lr]=center{left, right}, top=center-center |
| | For example, if there are two speakers and one channel is sent with the standard mix enabled, the one channel will be sent to both the left and right speakers. Conversely, if the same terminal were sent 6 channels, channels 0,2,4,5 will be mixed and sent to the left speaker and channels 1,3,4,5 will be mixed and sent to the right speaker. The terminal speakers are set up in the same manner. |
| | The full mixing matrix is available in the full specification. |
| Flush | There may be no commands in the display stream for a period of time following this command; therefore, this is a good point for clients to flush all unfinished rendering to the screen. The epoch field provides 32 additional high order bits of 16 bytes set to all 0xFF. This command provides an opportunity to re-synchronize data stream after a drop-out. The sequence number of a flush command is normally the same as the last non-flush command. However, when a epoch |

APPENDIX A-continued

Command Protocol Example is exhausted, (i.e. . . . the sequence number of the last command is 0xFFFFFF), a flush command with a sequence number of zero and a new epoch number (incremented by 1) is sent.

Back-channel Commands

Wire Protocol Status Message Formats

The basic status command format is:
<COMMAND:8> <TIME:24> <Info>

| COMMAND | Code | <Info> Description |
|---|---|---|
| Keyboard State | 0xc1 | <INDEX:8> <COUNTRY_CODE:8> <LOCKS:8> <MODIFIERS:8> <KEYCODE:8> [8] |
| Pointer State | 0xc2 | <INDEX:8> <DIM:2> <BUTTONS:6> <x:16> {<Y:16> {<Z:16> {<P:16> <R:16><H:16>}}} note that all values are signed, 2's compliment. Angular values range from −180 to +180-(1 lsb)=+179.9945 (degrees over full range.  DIM  Dimensions   0  X   1  X, Y   2  X, Y, Z   3  X, Y, Z, P, R, H (yaw) |
| Active Region | 0xc3 | <X:16> <Y:16> <WIDTH:16> <HEIGHT:16> |
| Damage | 0xc4 | <EPOCH:32> <PAD0:8> <SEQ_L:24> <PAD1:8> <SEQ_H:24> |

Note: TIME is in microseconds; it wraps after 2**24 (approx 16 seconds).

Status Message Descriptions

| Command | Description |
|---|---|
| Keyboard State | Reports the state of the <INDEX>'ed keyboard. The country code is from the USB Device Class Definition for HIDS, section 6.2. The locks are from the USB class definition for boot keyboards:  0x01  Num Lock  0x02  Caps Lock  0x04  Scroll Lock  0x08  Compose  0x10  Kana  The 'Set Key Locks' command may be used to reset these locks, and should be used if a lock key is detected at the host since keyboards generally don't locally handle lock status, and the terminal certainly doesn't either. Bits other than those specified are reserved and should be ignored. On set, they should be set to zero. The modifier bits are from the USB class definition for boot keyboards as well:  0x01  Left Control  0x02  Left Shift  0x04  Left Alt  0x08  Left GUI  0x10  Right Control  0x20  Right Shift  0x40  Right Alt  0x80  Right GUI  There is always space for six key scancodes. All keys (that are not modifiers) that are pressed are reported, up to six keys. This provides simple roll-over and chording |

-continued

|  |  |
|---|---|
|  | capabilities. The scan codes are from the USB class definition for boot keyboards. Of special note is code 0x00 denoting no event in the slot, and 0x01 in all slots indicates that more than 8 keys have been pressed. Modifiers are still reported in this state. Once less than 9 keys are pressed, normal reports resume. 'Report order is arbitrary and does not reflect order of events.' |
| Pointer State | Reports the state of the <INDEX>'ed pointer. DIM indicates the number of dimensions reported: 1, 2, 3, or 6. The buttons are from the USB class definition for boot keyboards, bit zero is the 'primary' button (on the left), and the numbers increase from left-to-right. The reported values are all absolute and are signed, two's compliment. |
| Active Region | Indicates the area of the logical framebuffer that is retained on the newt. Specifically, this is the area that the "from" region of Copy rendering commands can be specified successfully. This region may change over time on a given client, for example, due to a pan-and-scan style of interface in a hand-held device. Also, different client devices may report different active regions. |
| Damage | Indicates that downstream (render) commands from sequence number SEQ_L through and including sequence number SEQ_H in epoch EPOCH were not received by the client from the server. PAD0 and PAD1 must be 0. The client will continue to report damage until a Damage Repair message for the affected sequence number is received. If SEQ_L is 0, then the full current screen image must be sent. Once a damage message is sent for a given sequence number, no new subsequent damage may be sent for earlier sequence numbers. However, it is permissible to collapse two or more ranges into one in order to save space in later status packets. |

DPCM YUV Description:

Further compression of YUV data is possible with the LUMA_ENCODING of 1.
Luma data is encoded as follows:
    for each line
        last_value = 0x80
        for each luma-value 1 in line
            diff = 1 - last_value
            q_value = quant[diff]
            last value = clamp[last_value + dquant[q_value]]
            emit q_value
        end
    end
Luma data is decoded as follows:
    for each line
        last_value = 0x80
        for each quantization-value q_value in line
            last_value = clamp[last_value + dquant[q_value]]
            emit last_value
        end
    end
Clamp is a clamping table; clamp[i] is:
    0       if i < 0;
    255    if i > 255;
    1       otherwise.
The quantizer used is:

| Difference | code | rquant |
|---|---|---|
| −255 to −91 | 0 | −100 |
| −90 to −71 | 1 | −80 |

-continued

| | | |
|---|---|---|
| −70 to −51 | 2 | −60 |
| −50 to −31 | 3 | −40 |
| −30 to −16 | 4 | −20 |
| −15 to −8 | 5 | −10 |
| −7 to −3 | 6 | −4 |
| −2 to 0 | 7 | −1 |
| 1 to 2 | 8 | 1 |
| 3 to 7 | 9 | 4 |
| 8 to 15 | 10 | 10 |
| 16 to 30 | 11 | 20 |
| 31 to 50 | 12 | 40 |
| 51 to 70 | 13 | 60 |
| 71 to 90 | 14 | 80 |
| 91 to 255 | 15 | 100 |

What is claimed is:

1. In a computer system, a method of sessions comprising:
initiating a persistent session on behalf of a user;
maintaining information for said persistent session associated with said user;
initiating at least one service in said persistent session, said at least one service capable of execution while said user is connected, disconnected, and reconnected to said persistent session;
notifying said at least one service when said user connects to a human interface device of said computer system, when said user disconnects from said human interface device, and when said user reconnects to said human interface device;
said at least one service directing its output to said human interface device while said user is connected to said human interface device.

2. The method of claim 1 wherein said information maintained for said persistent session comprises an identification of said at least one service associated with said persistent session.

3. The method of claim 2 wherein said information maintained for said persistent session identifies whether said at least one service is active and whether said at least one service is a required service of said persistent session.

4. The method of claim 3 wherein said at least one service is initiated upon user connection to said system when said at least one service is a required service.

5. The method of claim 1 wherein said information maintained for said persistent session comprises a user identification and authentication information.

6. The method of claim 1 further comprising:
said at least one service discontinuing the transmission of output to said human interface device when said user disconnects from said human interface device, continuing to execute said service while said user is disconnected from said system.

7. The method of claim 1 further comprising:
authenticating said user using said persistent session information.

8. A system comprising:
a persistent session for a user;
a service executable in said computer system;
a network terminal capable of receiving output from and transmitting input to said service;
a session manager configured to notify said service when said user is connected to said network terminal, when said user is disconnected from said network terminal, and when said user is reconnected to said session via said network terminal;
said service configured to send output to said network terminal when said user is connected to said network terminal, and when said user is disconnected from said network terminal, said service configured discontinue sending output to said network terminal during execution, while continuing to operate on behalf of said user.

9. The system of claim 8 further comprising:
an authentication manager configured to validate said user of said network terminal at the initiation of a persistent user session.

10. The system of claim 9 wherein said authentication manager is configured to notify said session manager when a valid user reconnects to said network terminal.

11. The system of claim 8 wherein said session manager is configured to send an inquiry to said network terminal to determine whether said user is connected to said network terminal.

12. The system of claim 8 further comprising:
said persistent session associated with said user, said persistent session comprising said service.

13. The system of claim 8 further comprising:
at least one persistent session associated with said user wherein each persistent session comprises a plurality of services.

14. A computer program product comprising:
a computer usable medium having computer readable program code embodied therein for session management and user authentication comprising:
computer readable program code configured to cause a computer to authenticate a user to a computer system using one-way authentication;
computer readable program code configured to cause a computer to initiate a persistent session for said user;
computer readable program code configured to cause a computer to maintain information for said persistent session associated with a user;
computer readable program code configured to cause a computer to initiate at least one service in said persistent session, said at least one service capable of execution while said user is disconnected from said persistent session;
computer readable program code configured to cause a computer to notify said at least one service when said user connects to a human interface device of said computer system and when said user disconnects from said human interface device;
computer readable program code configured to cause a computer to direct output of said service to said human interface device while said user is connected to said human interface device.

15. The computer program product of claim 14 wherein said information maintained for said persistent session comprises an identification of said at least one service associated with said persistent session.

16. The computer program product of claim 15 wherein said information maintained for said persistent session identifies whether said at least one service is active and whether said at least one service is a required service of said persistent session.

17. The computer program product of claim 16 wherein said at least one service is initiated upon user connection to said system when said at least one service is a required service.

18. The computer program product of claim 14 wherein said information maintained for said persistent session comprises a user identification and authentication information.

19. The computer program product of claim 14 further comprising:

computer readable program code configured to cause said at least one service to discontinue the transmission of output to said human interface device when said user disconnects from said human interface device, continuing said service while said user is unattached from said system.

20. The computer program product of claim 14 further comprising:

computer readable program code configured to cause a computer to authenticate said user using said persistent session information.

* * * * *